Feb. 9, 1926.
M. F. COX
1,572,772
GREASE CUP
Filed Jan. 10, 1923
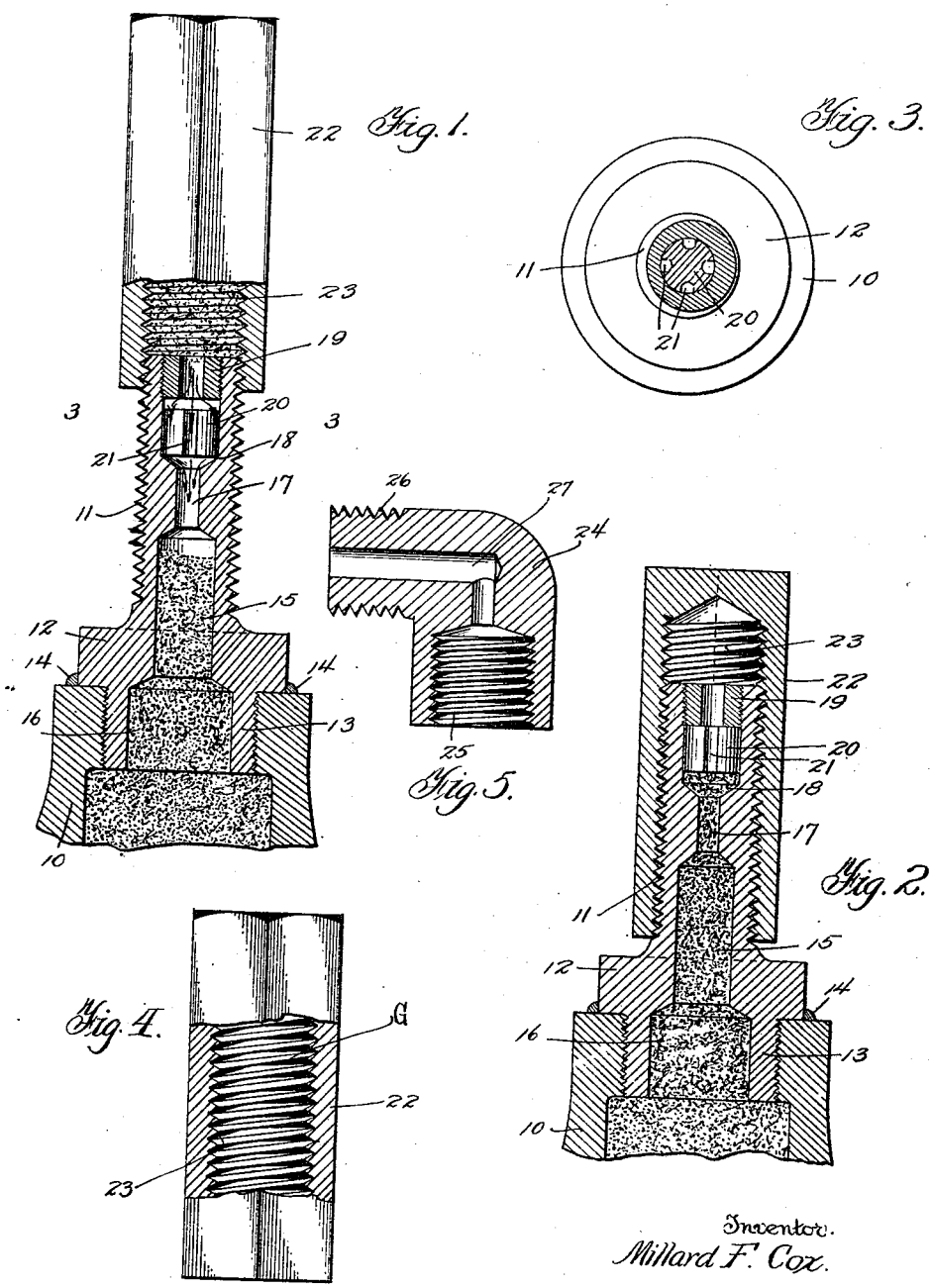
Inventor.
Millard F. Cox.
By Knight Bros.
Attorneys.

Patented Feb. 9, 1926.

1,572,772

UNITED STATES PATENT OFFICE.

MILLARD F. COX, OF LOUISVILLE, KENTUCKY.

GREASE CUP.

Application filed January 10, 1923. Serial No. 611,905.

*To all whom it may concern:*

Be it known that I, MILLARD F. Cox, a citizen of the United States, and a resident of Louisville, in the county of Jefferson and State of Kentucky, have invented certain new and useful Improvements in Grease Cups, of which the following is a specification.

My invention relates to a grease cup and hand filler and further, to a method of lubricating, wherein this grease cup and hand filler are employed.

The invention is described as used for lubricating main bearings and side rods and the like of locomotives, because the grease cup and hand filler herein illustrated and the method herein described are particularly adapted for handling the type of grease now universally employed as a lubricant by railroads.

When grease was adopted as a lubricant by the railroads in place of oil, it necessitated a change in the lubricant cups, inasmuch as the style of cups and caps previously used for oil were impractical because of the change in composition of the lubricant. The type of grease generally adopted is a heavy composition, having a density greater than petrolatum, it being somewhat of the consistency of putty, but considerably more resilient. The composition of the grease is such that it could not be practicably handled by even the stoutest of grease guns and does not flow even when subjected to considerable heat.

The grease was generally applied by providing rod cup cavities which would be nearly filled with the grease whereupon a threaded cap or plug would be screwed into the cavity. It then became necessary to use the plug as a jack screw, rotating the same and forcing the grease into the opening of the rod or other part to be lubricated. Owing to the composition of the grease as mentioned hereinbefore, it required a considerable application of power to rotate the plug sufficiently to force the grease against the part to be lubricated.

After repeated operations of this sort the threads of the plugs and cavities became worn and hence the plugs were frequently lost along the road beyond recovery. This continual loss of caps and plugs while negligible in each instance amounted in the aggregate to a considerable expense.

It is therefore an object of this invention to provide a new style of grease plug which could be applied to the main and side rods of locomotives and the like, in such a manner as to become fixtures, it being possible to weld these plugs in place thereby insuring against loss or removal. The necessity for removing the plugs is minimized by the care exercised in wearing or mutilating the threads, the wear usually occasioned to these threads being transferred practically entirely to the hand filler yet to be referred to. Thus it would only be necessary to remove the plugs to facilitate general repairs to the rods and in isolated cases where the plug became damaged.

The hand filler forming a part of this invention comprises essentially a cap having a supply of grease sufficient to replenish the supply of the cup during the time the locomotive is out of the station or away from the places where the plugs could be refilled by laborers hired for that purpose. Furthermore, I propose to construct the fillers of brass or bronze so that practically all of the wear occasioned by the repeated engagement of the screw threads of the plug and filler will be upon the threads of the filler.

My invention further contemplates the provision of a floating grooved piston arranged preferably adjacent the top of the plug, thus preventing foreign matter such as dust, cinders or the like from entering the interior of the plug and also preventing the grease which is generally under pressure therein from backing out.

The invention will be described in the following specification, reference being had to the accompanying drawings, wherein:

Fig. 1 is a view partly in section and partly in elevation, showing the plug and filler, just prior to forcing an additional supply of grease therein, Fig. 2 is a somewhat similar view showing the plug completely filled with lubricant, Fig. 3 is a sectional view taken on the plane indicated by line 3—3 in Fig. 1, Fig. 4 is an elevational view, partly in section of the filler, and, Fig. 5 is a detail sectional view of an attachment employed in some instances in filling the plugs.

Referring now more particularly to the drawings it will be noted that only so much of the bearing to be lubricated is illustrated as to show the application of the invention, it being obvious as the description proceeds that the herein described lubricating plugs may be used with facility on various types of bearings.

In the drawings, the reference character 10 indicates the portion of a bearing into which the plug is adapted to be threaded, the plug consisting of an upper threaded stem 11, a central enlarged porton 12 and a lower threaded portion 13. The portion 13 as illustrated is adapted to be threaded into the bearing 10, the enlargement 12 bearing on the upper face thereof and providing a squared portion adapted to be engaged by the wrench. The plug is adapted to be welded in place, the line of welding being indicated by the reference character 14. As mentioned previously, it is practical to weld in place plugs constructed in accordance with my invention because of the permanency of the structure attributed thereto.

The plug is formed with a longitudinal opening 15 which is enlarged somewhat at 16 where the plug communicates with the bearing, the plug being formed nearer its upper end with an internal boss or collar 17 forming a circumferential shoulder 18. A sleeve 19 is threaded into the upper end of the plug to retain in place a floating piston 20 which piston is provided with a plurality of vertically arranged grooves 21.

The thickness of the sleeve 19 and the depth of the grooves 21 is so selected that when the piston 20 is in its upper position illustrated in Fig. 2, the plug is closed, thus preventing the entrance of foreign matter into the plug or the backing out of the grease. However, with the piston in the position illustrated in Fig. 1, grease may be forced through the sleeve 19 and the grooves 21 and into the interior of the plug as clearly illustrated by the arrows in Fig. 1.

The reference character 22 indicates what is herein termed a filler, this filler being in the form of a cap provided with internal threads 23 adapted to engage the threaded stem 11 of the plug. This filler is preferably formed of brass, bronze or other metal relatively softer than the metal of the plug so that the wear occasioned during the threaded engagement between the plug and filler will be taken up by the filler which may be thrown away when worn out without any appreciable loss of time or money. This filler is normally completely filled with grease indicated by the reference character G so that during a run the engineer may replenish the grease in any of the plugs in which the supply is becoming exhausted or when any of the bearings are running warm.

Obviously the plug will be filled by men hired for that purpose at the terminals and round houses so that the beginning of a run the plug is filled and the pressure exerted by the grease maintains the piston 20 in its upper or closing position, as illustrated in Fig. 2. The peculiar characteristics of the grease now universally employed by railroads insures the maintenance of the piston in its upper position because when the grease warms up slightly it expands and exerts a considerable pressure.

As mentioned the engineer would preferably have a number of the fillers 22, the number corresponding at least to the number of plugs used on the locomotive, each filler being completely filled with the grease G. Therefore should the need arise the supply of grease in any of the plugs may be replenished by screwing the filler on to the threaded end of the plug, whereupon grease will be forced through grooves in the piston and into the interior of the plug until a sufficient amount has entered the plug to cause the piston to rise to the position illustrated in Fig. 2. The filler can then be unscrewed and put in some safe place until the occasion again arises where it is needed. Obviously the exterior surface of the filler 22 will be square or otherwise suitably shaped so as to facilitate its rotation by a wrench or other suitable instrument.

In Fig. 5 there is illustrated an attachment in the form of a right-angle connection 24 having an interiorly threaded end 25 and an exteriorally threaded end 26. The connection is bored centrally as indicated at 27. The connection is used in places where the filler 22 cannot be conveniently threaded on to the end of the plug, in this instance, the angular connection being threaded on to the end 11 of the plug and the filler 22 threaded onto the threaded end 26. In this manner the plugs may be supplied with grease even though they are disposed in inaccessible places.

From the foregoing it will be immediately apparent that I have provided a method and means of lubricating the parts of a locomotive with the type of grease now universally adopted and in a manner which successfully overcomes the objections prevalent in other known types of lubricating means. By providing the displaceable piston the necessity for a protecting cap is eliminated inasmuch as foreign matter cannot enter the plug, nor can the grease contained therein back out. By forming the filler of a softer material the possibility of injuring and thus rendering the plug unfit for use is minimized, thus offering the possibility of permanently welding the plugs in place to prevent loss or removal. The arrangement lastly provides the possibility of replenishing in a convenient and efficient manner the supply of lubricant in any of the plugs when the need becomes apparent.

Reservation is made to make such changes in size and proportion of the elements herein illustrated as may come within the purview of the accompanying claims.

Having thus described my invention, what I claim is:

1. A lubricating plug for locomotive rods, said plug being permanently positioned and having a central bore communicating with the part to be lubricated, said bore having a constricted portion, a piston slidable in said bore above said constricted portion, the periphery of said piston being longitudinally grooved, and an internal collar fixed in said bore above said piston, whereby a lubricant under pressure may be forced into said plug past said piston, the backing up of said lubricant forcing said piston against said collar whereby the latter overlaps the grooved periphery of said piston and prevents the escape of the lubricant.

2. A lubricating plug for locomotive rods, said plug being permanently positioned and having a central bore communicating with the part to be lubricated, said bore having a constricted portion, a piston slidable in said bore above said constricted portion, the periphery of said piston being longitudinally grooved, an internal collar fixed in said bore above said piston, whereby a lubricant under pressure may be forced into said plug past said piston, the backing up of said lubricant forcing said piston against said collar whereby the latter overlaps the grooved periphery of said piston and prevents the escape of the lubricant, said plug being externally threaded, and an internally threaded filler cap adapted to be screwed on said plug, said cap being of prismatic form for cooperation with a wrench or the like and being formed of a relatively softer material than said plug.

3. A lubricating plug for locomotive rods, said plug being permanently positioned and having a central bore communicating with the part to be lubricated, said bore having a constricted portion, a piston slidable in said bore above said constricted portion, the periphery of said piston being longitudinally grooved, and an internal collar screw-threaded in said bore above said piston, whereby a lubricant under pressure may be forced into said plug past said piston, the backing up of said lubricant forcing said piston against said collar whereby the latter overlaps the grooved periphery of said piston and prevents the escape of the lubricant.

MILLARD F. COX.